United States Patent [19]

Bogenschutz

[11] Patent Number: 4,548,237
[45] Date of Patent: Oct. 22, 1985

[54] BALL VALVE WITH IMPROVED VENT STRUCTURE

[75] Inventor: Thomas M. Bogenschutz, Clayton, N.Y.

[73] Assignee: General Signal Corporation, Stamford, Conn.

[21] Appl. No.: 561,492

[22] Filed: Dec. 14, 1983

[51] Int. Cl.⁴ .............................................. F16K 11/02
[52] U.S. Cl. .................................. 137/625.22; 251/315
[58] Field of Search .................. 137/625.22; 251/315; 137/302

[56] References Cited
U.S. PATENT DOCUMENTS

| | | | |
|---|---|---|---|
| 3,674,052 | 7/1972 | Hartman | 251/315 X |
| 4,099,543 | 7/1978 | Mong | 137/625.22 |
| 4,386,756 | 6/1983 | Muchow | 251/172 |

*Primary Examiner*—Alan Cohan
*Attorney, Agent, or Firm*—Pollock, Vande Sande & Priddy

[57] ABSTRACT

A ball valve is disclosed in which, in the closed position of the valve, a vent passage (74) extends through the ball element (22) and communicates with a further vent passage (58, 60, 62) extending through an annular seal (28) and the body (12) of the valve. See FIG. 1.

12 Claims, 6 Drawing Figures

U.S. Patent   Oct. 22, 1985   4,548,237
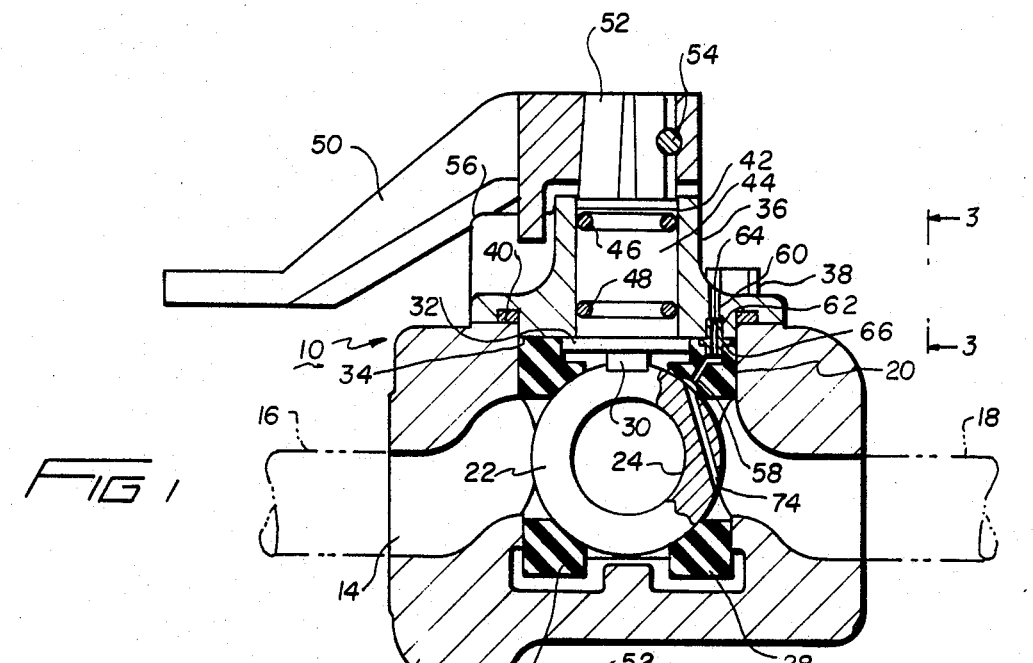
FIG 1
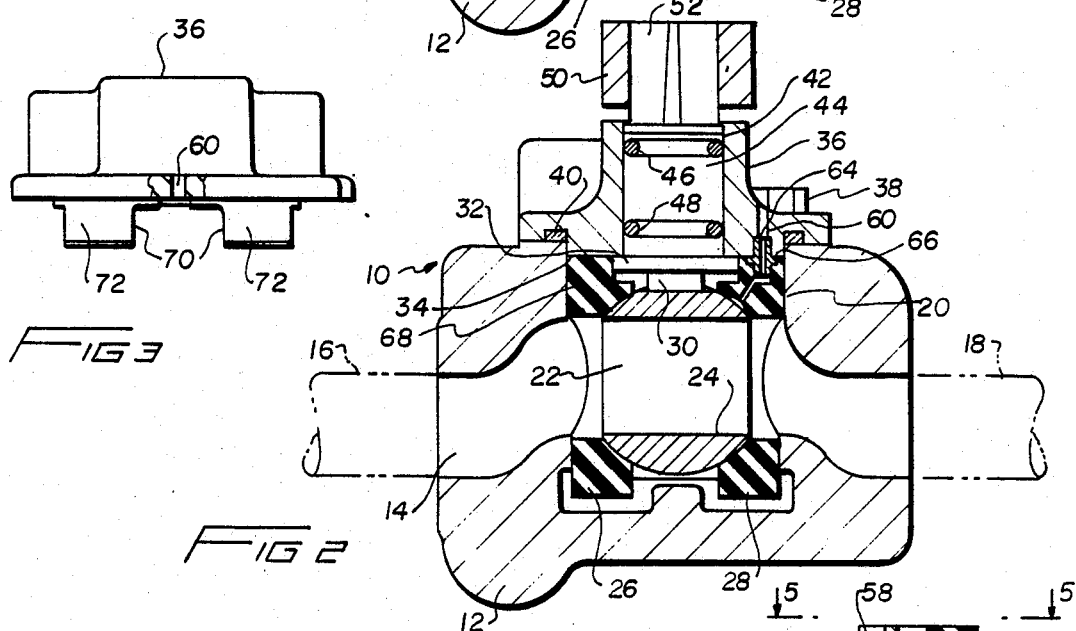
FIG 2
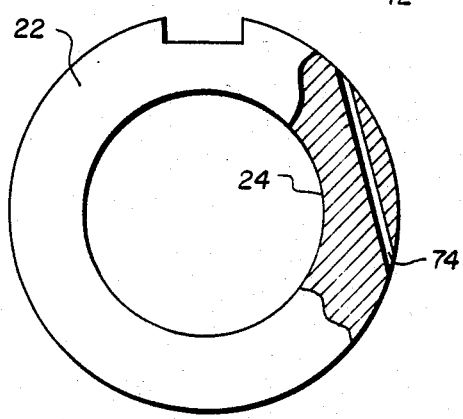
FIG 3
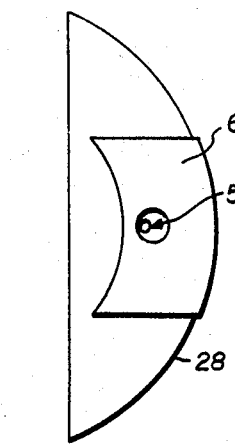
FIG 4
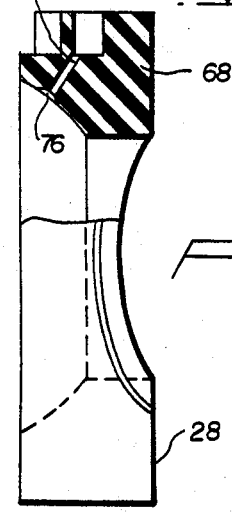
FIG 5
FIG 6

4,548,237

BALL VALVE WITH IMPROVED VENT STRUCTURE

DESCRIPTION

1. Technical Field

The present invention concerns valves used for controlling the flow of fluid, such as the flow of air through pneumatic brake systems on rail vehicles. More specifically, the invention concerns a ball valve incorporating improved structure for venting conduits connected to one side of the valve when the valve is closed.

2. Background Art

In many fluid systems, particularly pneumatic systems, it is often desired to disconnect one portion of the system from another without depressurizing both portions. For example, on railway cars, it is frequently necessary to isolate the brake cylinder when leaks develop in the pneumatic hoses leading to the brake cylinder or the brake cylinder packing cup develops excessive leakage. In either of these conditions, the supply of high-pressure air to the brake cylinder must be shut off in order to conserve air for operation of other rail cars. It is desirable in such applications that the hoses leading to the brake cylinder and the brake cylinder itself be vented after the supply of high pressure air has been shut off.

In addition to the valve used for isolating individual brake cylinders, freight cars typically include a brake pipe cut-out valve at each end of the car. The purpose of these cut-out valves is to bottle up brake pipe pressure before cars are uncoupled from the train. Prior to uncoupling, the brakeman closes the cut-out valve so that an emergency application of the brakes is not caused upon uncoupling. In this situation, it is desirable to vent the hoses which connect the brake pipes of adjacent cars so as to protect the brakeman from injury during manual uncoupling of the hoses.

One type of cut-out valve suitable for use in railway cars for the applications just discussed has been disclosed in U.S. Pat. No. 4,099,543 granted to Mong et al. A ball valve is disclosed in which a passage through the ball element connects with another passage in the lower stem of the ball element when the valve has been closed. Although the valve disclosed in this patent appears to be suitable for its intended purpose, the flow passages and seal configuration required for the stem of the ball element are relatively complex and therefore expensive to machine.

DISCLOSURE OF THE INVENTION

An object of the present invention is to provide a cut-out valve for controlling fluid flow in railcar brake systems which includes improved structure for venting the conduit on one side of the valve after the valve has been closed.

Another object of the invention is to provide such a valve in which the venting structure is uncomplicated and simple to manufacture.

Still another object of the invention is to provide such a valve in which the venting structure is configured to ensure proper alignment of vent passages when the valve is closed.

These objects of the invention are given only by way of example; therefore, other desirable objectives and advantages inherently achieved by the disclosed valve structure may occur or become apparent to those skilled in the art. Nonetheless, the scope of the invention is to be limited only by the appended claims.

The valve according to the invention preferably is a ball valve which includes a valve body having a fluid passage therethrough. As used in this specification, the term "valve body" includes not only the structure through which a fluid passage extends but also an associated bonnet element removable from this structure to permit access to the interior of the valve itself. At least one annular seal, but typically two of them, is positioned in the valve body surrounding the fluid passage. Between the seal elements is located a valve ball element having a central passage. Means extend into the valve body for rotatably supporting the ball element in engagement with one or both of the annular seals, to close the valve by positioning the central passage of the ball element transverse to the fluid passage of the valve body and to open the valve by positioning the central passage in alignment with the fluid passage. In accordance with the invention, a first vent passage is provided through the valve body and through at least one of the annular seals, flow through this first vent passage being blocked by the ball element when the valve is open. A second vent passage extends through the ball element, the second vent passage being connected with the first vent passage and with the fluid passage on one side of the ball element when the valve is closed. As a result, fluid under pressure on one side of the ball element is vented to the exterior of the valve body when the valve is closed.

In the preferred embodiment, a cylindrical flow restrictor element is positioned between the valve body and the at least one annular seal. This restrictor element comprises a central bore which forms a portion of the first vent passage. Preferably, the restrictor element extends into a bore formed in the valve bonnet and also into at least one of the seals, thereby maintaining that seal in proper alignment with the valve body and ball element. To further ensure proper alignment of the vent passages when the valve is closed, the seal element through which the first vent passage extends preferably includes an outwardly extending boss surrounding the vent passage. The valve bonnet includes a recess means for receiving this boss, thereby further ensuring that the seal element and the vent passages will remain in proper alignment with the valve body and ball element.

BRIEF DESCRIPTION OF THE DRAWINGS

FIG. 1 shows an elevation view, partially in section, of a valve according to the invention, the valve being in its closed position with the right side vented to ambient.

FIG. 2 shows an elevation view, partially in section, of a valve according to the invention, the valve being shown in its open position.

FIG. 3 shows a view, partially broken away, of the valve bonnet according to the invention, the view of the Figure having been taken essentially along line 3—3 of FIG. 1.

FIG. 4 shows an enlarged elevation view, partially in section, of a valve ball element according to the invention.

FIG. 5 shows a top plan view of an annular seal element according to the invention, taken along line 5—5 of FIG. 6.

FIG. 6 shows a side elevation view, partially in section, of an annular seal element according to the invention.

BEST MODE FOR CARRYING OUT THE INVENTION

The following is a detailed description of the invention, reference being made to the drawings in which like reference numerals identify like elements of structure in each of the several Figures.

Referring initially to FIGS. 1-3, a ball valve 10 is illustrated which embodies the improvement according to the present invention. A valve body 12 is formed from a suitable material such as steel and machined or cast and machined to the configuration illustrated. A central fluid passage 14 extends through valve body 12 and, in use, forms a continuation of conduits 16 and 18, shown in phantom. Within valve body 12, a transverse bore 20 extends downward from the upper portion of the body and intersects central passage 14. Within bore 20, a valve ball element 22 is situated. The ball element may be machined from metal or other suitable material and may also assume other shapes such as ellipsoidal without departing from the scope of the present invention. A central passage 24 extends through the ball element and aligns with central passage 14 when the valve is open, as in FIG. 2. Depending on the intended application for the valve, at least one annular seal element 26 and preferably a second annular seal element 28 are positioned within bore 20. Each seal element comprises a spherical sealing surface which engages the corresponding spherical surfaces of ball element 22.

Extending upwardly from the ball element is an actuator shaft 30 which includes a radially extending flange 32 bearing on the underside 34 of a bonnet element 36. A plurality of suitable fasteners 38 are provided which secure bonnet element 36 to valve body 12 in the familiar manner. A seal such as an O-ring 40 is positioned between the valve body and the bonnet element. An interior bore 42 in the bonnet element rotatably receives an enlarged extension 44 of actuator shaft 30. To prevent leakage between bore 42 and enlarged extension 44, a pair of spaced O-rings 46, 48 are included. An actuator handle 50 is affixed to the upper portion 52 of shaft 30. If desired, actuator handle 50 may be pivotably mounted on upper portion 52 by means of a suitable pivot shaft 54 which enables actuator handle 50 to be moved as necessary to clear stop 56 on bonnet element 36.

Referring now to FIGS. 1, 5 and 6, a first vent passage is comprised of a passage 58 extending through at least one of the annular seals 26, 28 and a further passage 60 extending through the bonnet element 36. A cylindrical flow restrictor element 62 is positioned between the bonnet element and the annular seal 28. A central bore 64 of restrictor element 62 thus connects passages 58 and 60. Preferably, flow restrictor element 62 extends into passage 58 of the rubber seal element and also is press fitted into passage 60 in bonnet element 36. As a result of this configuration, restrictor element 62 restrains seal element 28 from rotation within the valve body which could lead to misalignment of passages 58 and 60. Finally, a radially extending flange 66 on restrictor element 62 is received within a corresponding counterbore in bonnet element 36. This flange ensures that a sufficient portion of restrictor element 62 will project from the bonnet portion into engagement with the adjacent seal element. To provide further assurance against unwanted relative movement between the various passages, an outwardly extending boss 68 is provided at the top of both annular seals 26, 28, as shown in FIGS. 5 and 6. Boss 68 projects upwardly into a correspondingly shaped recess means 70 shown in FIG. 3. Recess 70 is defined by a pair of downwardly extending bosses 72 on the underside of bonnet element 36.

To complete the vent passage through the valve, a second vent passage 74 is drilled through the ball element 22 in position to connect with passage 58 when the central passage 24 of the ball element is transverse to the fluid passage 14 of the valve body and the valve is closed, as illustrated in FIG. 1. To allow for some misalignment between passage 74 and passage 58, an enlarged portion 76 is provided in passage 58 where it meets the ball element as illustrated in FIGS. 1 and 6.

When the valve according to the invention is open as shown in FIG. 2, flow of fluid proceeds through conduits 16 and 18 and central passages 14 and 24 while the vent passages 74 and 58-60 are isolated from one another by the annular seal rings. But, when the valve is rotated 90° to the position shown in FIG. 1, passage 74 communicates directly with passage 58, flow restrictor 62 and passage 60 to vent pressurized fluid from conduit 18.

Having described my invention in sufficient detail to enable those skilled in the art to make and use it, I claim:

1. An improved ball valve comprising:
   a valve body having a fluid passage therethrough;
   a valve ball element having a central passage;
   a pair of annular seals positioned in said body, one on each side of said valve ball element, each said seal surrounding said fluid passage;
   means for rotatably supporting said ball element within said body and in engagement with said seal; for closing said valve when said central passage is transverse to said fluid passage; and for opening said valve when said central passage is aligned with said fluid passage;
   a first vent passage through said valve body and through one of said annular seals, said first vent passage being blocked by said ball element when said valve is open;
   a flow restrictor element positioned between said valve body and said one seal, said restrictor element having a bore forming a portion of said first vent passage; and
   a second vent passage through said ball element, said second vent passage being connected with said first vent passage and said fluid passage on one side of said ball element when said valve is closed,
   whereby fluid under pressure on said one side of said ball element is vented to the exterior of said valve body when said valve is closed.

2. A valve according to claim 1, wherein said flow restrictor element extends into said valve body and said at least one seal, thereby maintaining said at least one seal element properly aligned with said valve body.

3. A valve according to claim 2, wherein there are two of said annular seals, one on each side of said ball element.

4. A valve according to claim 3, wherein said first vent passage extends through one of said annular seals.

5. A valve according to claim 2, wherein said valve body comprises a bonnet element to which said means for rotatably supporting is mounted, said first vent passage extending through said bonnet element.

6. A valve according to claim 5, wherein said at least one annular seal element comprises an outwardly extending boss surrounding said first vent passage and said bonnet element comprises means for receiving said boss, thereby further maintaining said at least one seal element properly aligned with said valve body.

7. A valve according to claim 6, wherein there are two of said annular seals, one on each side of said ball element.

8. A valve according to claim 7, wherein said first vent passage extends through one of said annular seals.

9. A valve according to claim 1, wherein said valve body comprises a bonnet element to which said means for rotatably supporting is mounted, said first vent passage extending through said bonnet element.

10. A valve according to claim 9, wherein said at least one annular seal element comprises an outwardly extending boss surrounding said first vent passage and said bonnet element comprises means for receiving said boss, thereby maintaining said at least one seal element properly aligned with said valve body.

11. A valve according to claim 10, wherein there are two of said annular seals, one on each side of said ball element.

12. A valve according to claim 11, wherein said first vent passage extends through one of said annular seals.

* * * * *